United States Patent [19]

Orain

[11] 4,229,871

[45] Oct. 28, 1980

[54] METHOD FOR PRESTRESSING AN AXIALLY RETAINED HOMOKINETIC JOINT

[75] Inventor: Michel A. Orain, Conflans Ste Honorine, France

[73] Assignee: Glaenzer Spicer, Poissy, France

[21] Appl. No.: 929,816

[22] Filed: Jul. 31, 1978

[30] Foreign Application Priority Data

Sep. 5, 1977 [FR] France .................................. 77 26873

[51] Int. Cl.³ .............................................. B23P 11/00
[52] U.S. Cl. ........................................ 29/407; 29/434; 29/451
[58] Field of Search ................. 29/407, 434, 436, 446, 29/450, 451, 453; 64/7, 8, 21

[56] References Cited

U.S. PATENT DOCUMENTS

| 3,099,879 | 8/1963 | Horovitz | 29/436 |
| 3,178,907 | 4/1965 | Lyons | 29/434 |
| 3,290,754 | 12/1966 | Pitner | 29/434 |
| 3,606,666 | 9/1971 | Briggs | 29/407 |
| 3,757,534 | 9/1973 | Orain | 64/21 X |
| 3,792,598 | 2/1974 | Orain | 64/21 |
| 4,050,130 | 9/1977 | Pitner | 29/434 X |

*Primary Examiner*—Ervin M. Combs
*Attorney, Agent, or Firm*—Wenderoth, Lind & Ponack

[57] ABSTRACT

The method permits mass-producing axially retained tripod joints having high rigidity and a given prestressing force which is reproducible from one joint to another. According to this method, after having clipped a resiliently yieldable attachment onto a tulip-shaped element of the joint while the joint is in its assembled position, the value of the gap between the shoulder of a thrust member and a bearing surface of a hub carrying the trunnions is determined for the position of the joint in which the hub and tulip-shaped member are in alignment and the thrust member is axially shifted away from the hub and there is introduced in the gap produced between the thrust member and the hub a shim the thickness of which is chosen to be slightly larger than the gap.

4 Claims, 7 Drawing Figures

METHOD FOR PRESTRESSING AN AXIALLY RETAINED HOMOKINETIC JOINT

BACKGROUND OF THE INVENTION

The present invention relates to homokinetic joints and in particular such joints which allow a wide angular deviation between the two joint parts and comprise an axial retaining device.

The homokinetic joints of the invention are adapted to interconnect two shafts or like members and comprise a first element in the shape of a tulip rigid with one of the two shafts to be connected and defining raceways and a second element rigid with the other shaft and comprising a hub from which extend the trunnions on which are rotatably and slidably mounted rollers received in the raceways of the first element. In a tripod joint the tulip-shaped element defines three raceways having a part-circular section and each receiving a roller carried by each of the three trunnions of the second element which consequently has the shape of a tripod.

Such joints allow a wide angular deviation between the joint parts and are often axially fixed by providing between the tulip-shaped element and the hub of the element carrying the trunnions an axial retaining device allowing, on one hand, a ball joint movement and, on the other hand, a sliding movement in a direction perpendicular to the axis of one of the two shafts. For this purpose, the tulip element is usually at least partly closed by a resiliently yieldable attachment comprising a plurality of branches which are hooked onto corresponding branches of the tulip element, this attachment defining in its centre part a retaining surface for the hub of the element defining the trunnions. There is also provided at least one thrust member which is slidably mounted in the hub of the tripod element along the axis of the associated shaft. This member usually has the shape of a mushroom which has a stem received in the hub and comprises a radial shoulder capable of coming in contact with a radial bearing surface of the hub.

It has been found that in certain applications, and in particular in front-drive vehicles, such joints are subjected to vibrations produced by the vehicle driving engine unit, the state of the road and various frictions. The axial retaining system is then stressed cyclically and to obtain a silent and durable operation, two conditions must be satisfied, namely:

1. A given prestressing force must be exerted in the axial retaining device.

2. The axial rigidity of this retaining device must be as high as possible in order to avoid that it be put into resonance under the effect of the cyclic excitations coming mainly from the engine.

Now, these two conditions are practically impossible to satisfy simultaneously since the prestressing force to be exerted depends to a large extent on the algebraic sum of the manufacturing tolerances of the various component parts of the joint and in particular the tulip element, the resiliently yieldable attachment, the hub of the tripod element and the mushroom-shaped thrust member. Moreover, the clipping of the resiliently yieldable attachment can only be achieved under axial prestress since this clipping occurs when the joint is already in the assembled position and therefore under unfavourable conditions of access and visibility.

SUMMARY OF THE INVENTION

An object of the invention is to provide a method and a device for prestressing a homokinetic joint which permits imparting to the prestressing device satisfactory rigidity and prestressing force while allowing an easy, rapid and reliable assembly of the joint applicable to mass-production.

The method according to the invention is mainly applicable to a joint such as that defined hereinbefore in which the axial retaining device comprises at least one thrust member slidably mounted in an axial bore in the hub, this thrust member comprising a radial shoulder in facing relation to a radial bearing surface of the hub, and a resiliently yieldable attachment fixed to the end of the tulip element. According to this method, after having clipped the resiliently yieldable attachment onto the tulip element while the joint is in the assembled position, the value of the gap between the shoulder of the thrust member and the bearing surface of the hub is determined for the position of alignment of the two joint parts, the thrust member is moved axially away from the hub and there is introduced between the thrust member and the hub a shim whose thickness is so chosen as to be slightly greater than said gap. Preferably, the thrust member is shifted axially away from the hub by bringing the joint to its position corresponding to maximum angular deviation of the joint parts.

Another object of the invention is to provide a homokinetic joint comprising a tulip element defining raceways for rollers rotatably and slidably mounted on trunnions rigid with a hub, axial retaining means between the tulip element and the hub and comprising at least one thrust member which is axially slidably mounted in the hub and has a radial shoulder in facing relation to a radial bearing surface of the hub and a resiliently yieldable attachment fixed to the end of the tulip element, wherein there is provided between the radial shoulder of the thrust member and the adjacent radial bearing surface of the hub a shim formed by a resiliently yieldable ring clipped on the thrust member and having an axial thickness which is slightly greater than the gap between the radial shoulder and the adjacent radial surface of the hub when the joint is in the position of the alignment.

By means of this method, it is sufficient to have available a certain number of shims of different thicknesses to choose for each joint the shim which provides the desired prestressing force independently of the normal manufacturing tolerances of the different component parts of the joint and its axial retaining device.

BRIEF DESCRIPTION OF THE DRAWINGS

Several embodiments of the invention will be described hereinafter with reference to the accompanying drawings which are given by way of example and in which.

DETAILED DESCRIPTION OF THE INVENTION

Figure 1:
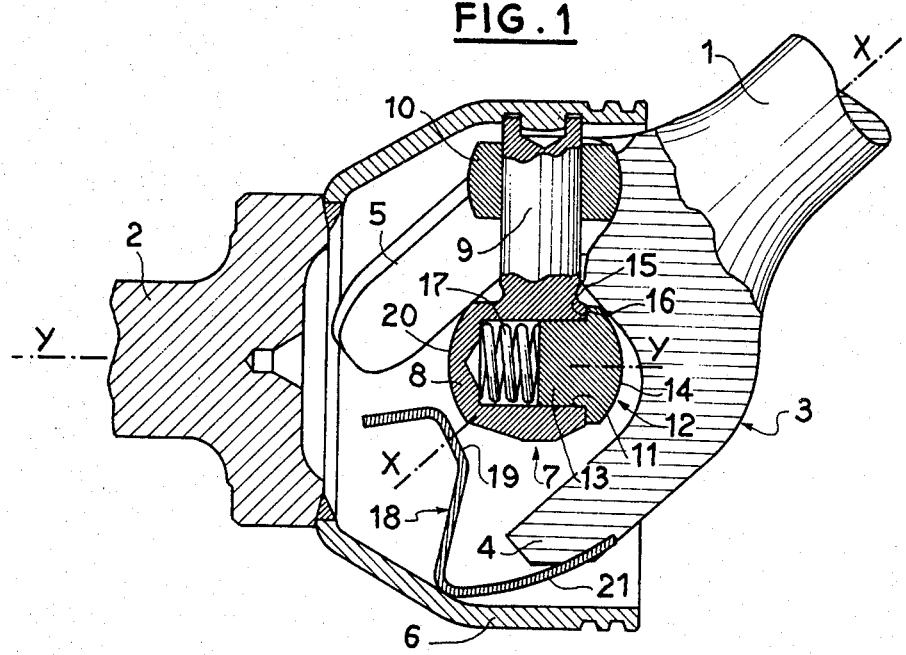
FIGS. 1 to 3 are longitudinal sectional views of a joint according to the invention at three different stages of the prestressing method.

Fig. 1 shows two shafts 1, 2 to be interconnected by a homokinetic joint according to the invention. The shaft 1 is rigid with an element 3 in the shape of a tulip and comprising three branches 4 which define three raceways 5 of part-circular section. The shaft 2 is rigid with a bowl-shaped element 6 in which is fixed an element 7 in the shape of a tripod comprising a hub 8 and three trunnions 9 on which are rotatively and slidably mounted part-spherical rollers 10 received in the raceways of the tulip element. In the illustrated embodiment, the hub defines an axial bore 11 in which there is received a mushroom-shaped thrust member 12 comprising a cylindrical stem 13 and a thrust surface 14 defining a part-spherical dome. This thrust member also has a radial shoulder 15 which is in facing relation to a radial bearing surface 16 of the hub. A compression spring 17 is interposed between the inner end of the bore or cavity 11 and the member 12. The axial retaining device is completed by a resiliently yieldable attachment 18 which defines a surface 19 adapted to bear against a part-spherical surface 20 of the hub and three branches 21 which are resiliently clipped onto the branches of the tulip-shaped element in the known manner which consequently need not be described in detail.

The prestressing method according to the invention is carried out in the following manner: the attachment 18 is previously introduced in the bowl-shaped element 6. The tulip-shaped element is fitted on the three rollers 10 and inclined at an angle in the neighbourhood of the maximum angle of deviation as shown in FIG. 1 so as to depress the thrust member 12 and cause it to bear by its shoulder 15 against the bearing surface 16 of the hub. The tulip element is then in its inner position in the bowl-shaped element 6 and the clipping of the branch 18 of the resiliently-yieldable attachment through which passes the plane of the axes X—X and Y—Y of the two shafts 1 and 2 can be easily achieved on the corresponding branch of the tulip element. The clipping of the other two branches of this attachment is achieved in the same way by pivoting the tulip element in the planes of these other two branches. Note that at this stage, apart from the fact that the relatively low axial force exerted by the spring 17 should be overcome, this operation is carried out in the absence of any axial prestress.

Figure 2:
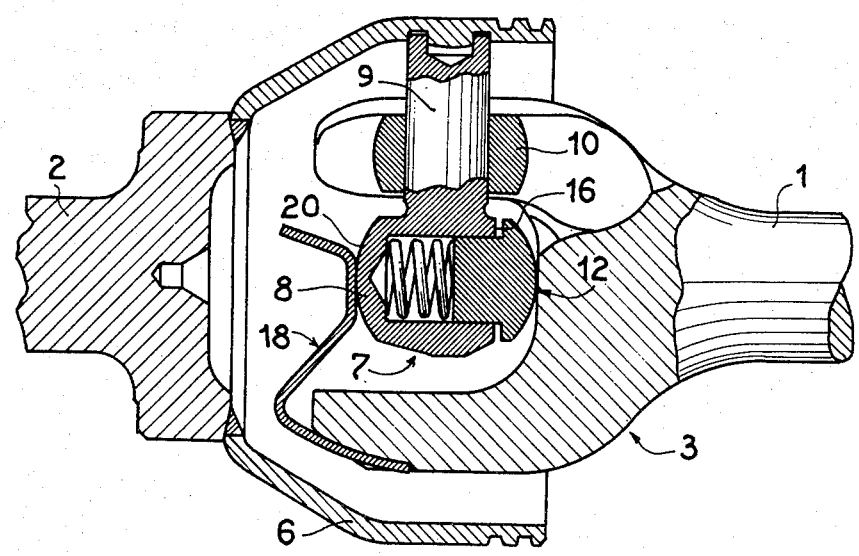

When the tulip element is released, and the two shafts are brought to their position of alignment (FIG. 2), a gap appears between the shoulder 15 and the surface 16 of the hub. This gap may be measured at this moment, for example by an axial displacement of the tulip element to a position in which the shoulder 15 abuts against the surface 16 or by means of a special gauge. By way of example, this gap may vary between about 0.5 and 1.5 mm.

Figure 3:
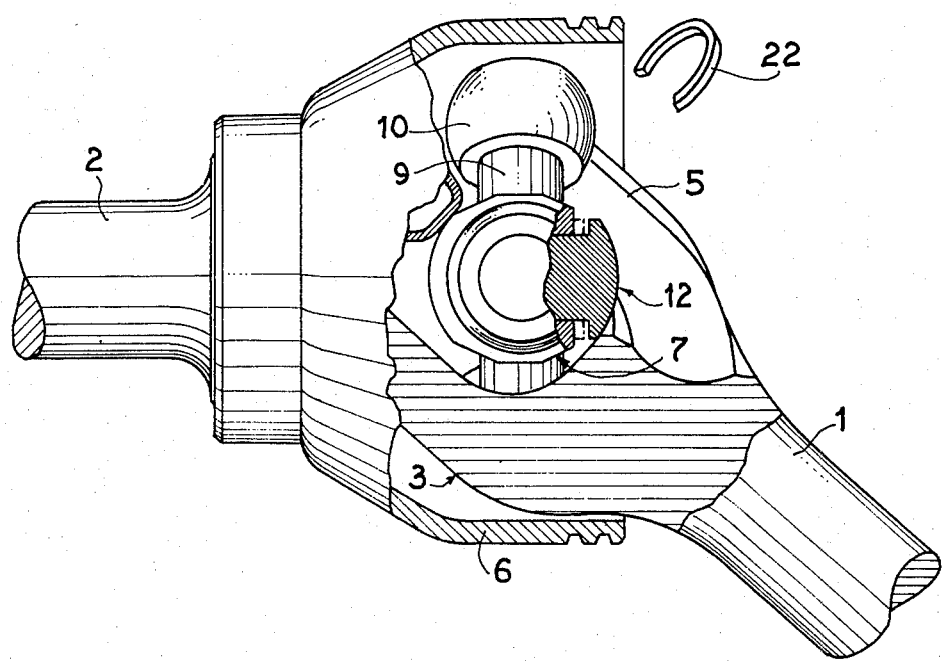

The joint is then brought to its position of maximum angular deviation between the joint parts (FIG. 3) by a rotation about one of the trunnions of the tripod element, which permits a maximum access to the thrust member 12 and increases the gap between the shoulder 15 and the bearing surface 16 and permits sufficient access to the thrust member 12 to allow the introduction of a shim 22 (FIG. 3) which is in the form of a resiliently yieldable split ring. The axial thickness of this shim is so chosen as to slightly exceed the value of the aforementioned gap measured in the position shown in FIG. 2 so that, when the joint is put back into the position corresponding to an alignment of the joint parts after introduction of the shim, the desired prestress is automatically obtained.

The excess thickness of the shim relative to the measured dimension or gap is constant for a given type of joint. It is determined experimentally in accordance with the axial rigidity of the resiliently yieldable attachment 18 and the value of the desired prestressing force. It is desirable to have available a series of shims of different thicknesses, the thickness difference between two successive shims may be from 1/100th of a millimeter to 1/10th of a millimeter, so that all the gaps resulting from the manufacturing tolerances of the various component parts of the assembly may be compensated for and the value of the desired prestressing force obtained with precision.

Figure 4:
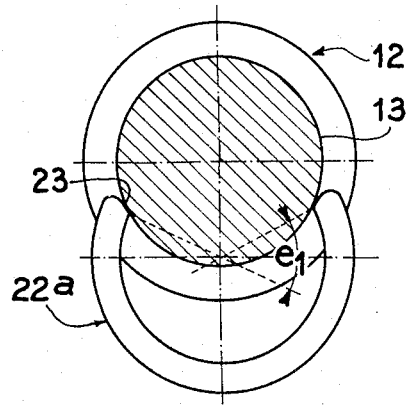
FIG. 4 is a detail view on an enlarged scale of a first embodiment of a shim which is part of this joint.

In the embodiment shown in FIG. 4, the resiliently yieldable split ring $22^a$ constituting the shim has a wrap-around angle $e_1$ which is sufficient to ensure that it is maintained on the stem 13 of the thrust member 12. In this embodiment of FIG. 4, it has a roughly constant radial width and an end chamfer 23 which facilitates its mounting.

Figure 5:
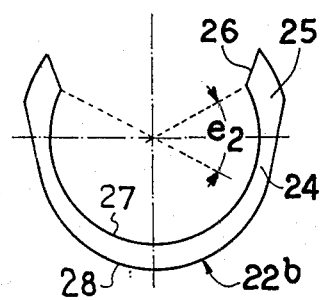
FIG. 5 is a view of a modification of this shim.

In the embodiment shown in FIG. 5, the split ring $22^b$ has a more complex shape and in particular a variable radial width which permits an improved distribution on the faces of the pressure resulting from the prestressing force and increasing the wrap-around angle $e_2$ without increasing the force required for mounting the ring on the stem. For this purpose, the ring has two roughly diametrally opposed zones 24 of minimum width and two end zones 25 of increased radial width terminating in bevels 26. The bore 27 is moreover slightly eccentric relative to the periphery 28. The pressure is thus evenly distributed on the two sides.

Figure 6:
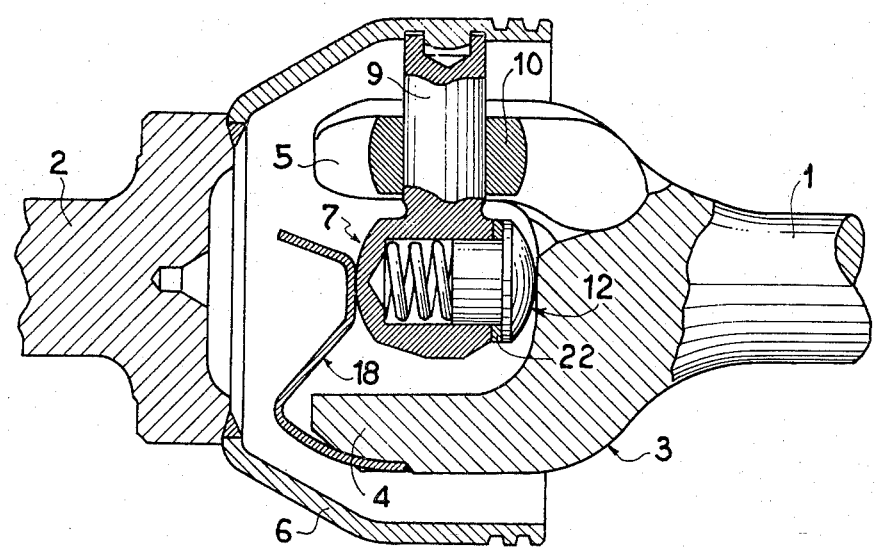
FIG. 6 is a longitudinal sectional view of the joint in the assembled position.

In the embodiment just described, which is shown assembled in FIG. 6, the axial retaining device comprises a spring 17 between the thrust member 12 and the inner end of the cavity 11 in the bore.

Figure 7:
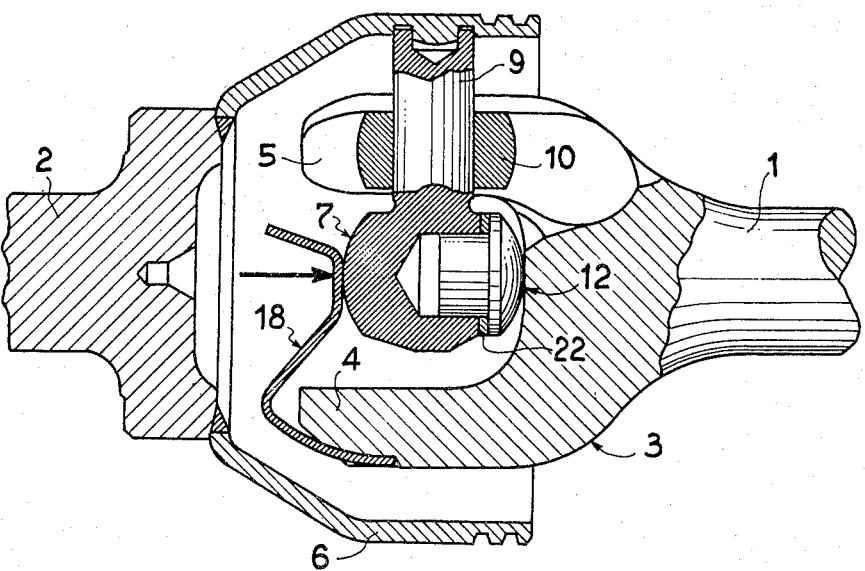
FIG. 7 is a view similar to FIG. 6 of a modification of the joint.

The function of this spring is to facilitate the assembly for taking up the clearances appearing in certain configurations. However, such a spring is not essential and there is shown in FIG. 7 an embodiment in which this spring is eliminated. However, in order to be able to measure the gap between the shoulder 15 of thrust member 12 and the adjacent bearing surface 16 of the hub, there should be exerted on the tulip element when the joint is in its position shown in FIG. 2 a pull and a depression. The displacement of the tulip element between these two positions is measured with precision and permits a determination of the class of the shim likely to provide the desired prestressing.

It is clear from the foregoing that the method and device according to the invention achieve the desired objectives. Thus, the method may be employed on an industrial scale and in mass-production and the rigidity of the resiliently yieldable attachment may be considerable while providing a precise prestressing force which is reproducible from one joint to another. This results from the fact that the shim, which determines the value of this prestressing force, is placed in position after measuring for each joint the real gap between the shoulder of the thrust member and the adjacent bearing surface of the hub.

Having now disclosed in my invention what I claim as new and desire to secure by Letters Patent is:

1. A method for axially prestressing a homokinetic joint comprising a first tulip element for rigidly connecting to one of two shafts to be interconnected and defining raceways, a second element for rigidly connecting to the other of said shafts and comprising a hub and trunnions extending from the hub, the hub defining an axial bore and a radial bearing surface, rollers respectively rotatively and slidably mounted on the trunnions and received in the raceways of the first element, an axial retaining device comprising at least one thrust member slidably mounted in the axial bore of the hub, said thrust member comprising a radial shoulder in facing relation to the radial bearing surface of the hub, and a resiliently yieldable attachment fixed to an end of the tulip element, said method comprising, clipping the resiliently yieldable attachment onto the tulip element while the joint is in an assembled position, then determining for a position of alignment of said first and second elements the size of a gap between the shoulder of the thrust member and the bearing surface of the hub, axially shifting the thrust member away from the hub, and introducing between the thrust member and the hub a shim having a thickness which is so chosen as to be slightly larger than said gap, thereby providing an axial prestress between said thrust member and said hub and thus between said first and second elements.

2. A method as claimed in claim 1, comprising measuring said gap by axially displacing the tulip member when the joint is in the position of alignment of said first and second elements until the shoulder is brought into abutting relation to the bearing surface of the hub.

3. A method as claimed in claim 1, comprising measuring said gap by exerting a pull on the tulip element when the joint is in the position of alignment of said first and second elements, and then depressing the tulip-shaped element until the shoulder is brought into abutting relation to the bearing surface of the hub.

4. A method as claimed in claim 1, comprising axially shifting the thrust member away from the hub by bringing the joint to its position of maximum angular deviation between said first and second elements.

* * * * *